Nov. 17, 1970 Q. BERG 3,541,494

METHOD OF FORMING ELECTRICAL CONNECTIONS

Original Filed Aug. 21, 1967 4 Sheets-Sheet 1

INVENTOR
QUENTIN BERG

BY Whittemore, Hulbert & Belknap

ATTORNEYS

Nov. 17, 1970 Q. BERG 3,541,494
METHOD OF FORMING ELECTRICAL CONNECTIONS
Original Filed Aug. 21, 1967 4 Sheets-Sheet 2
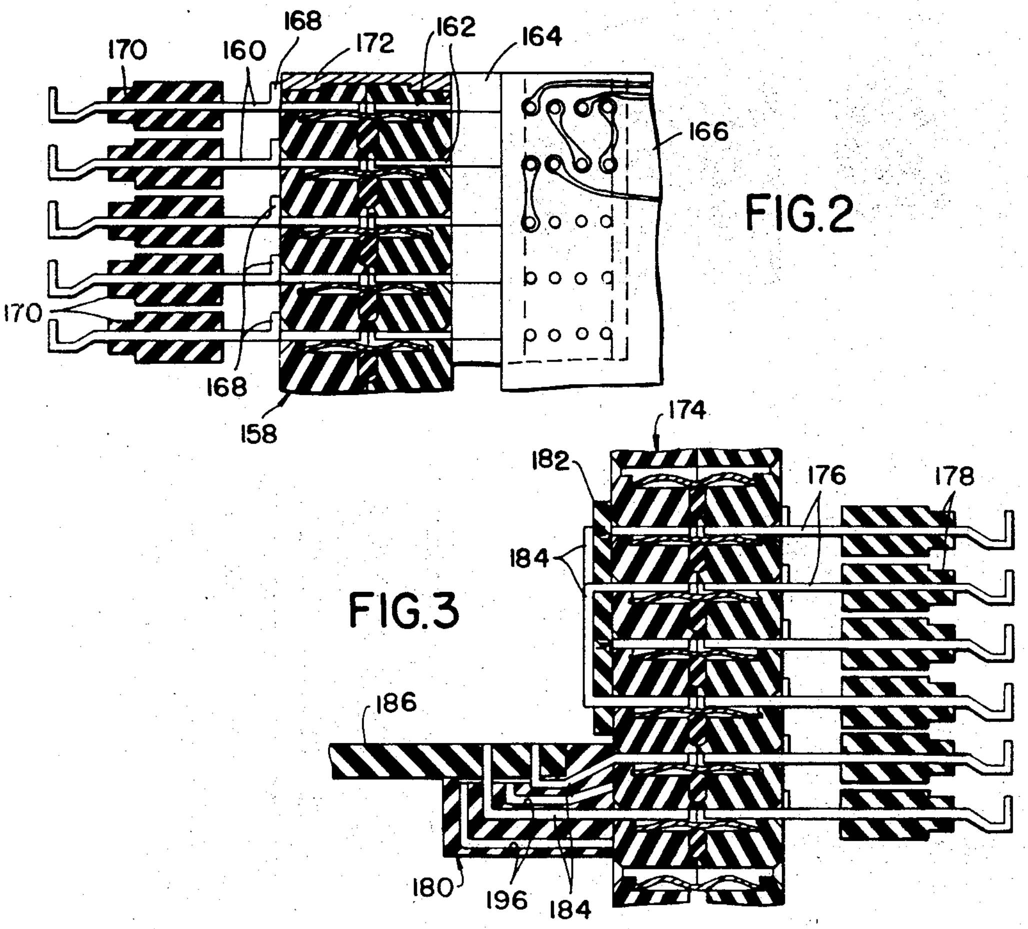
FIG. 2, FIG. 3
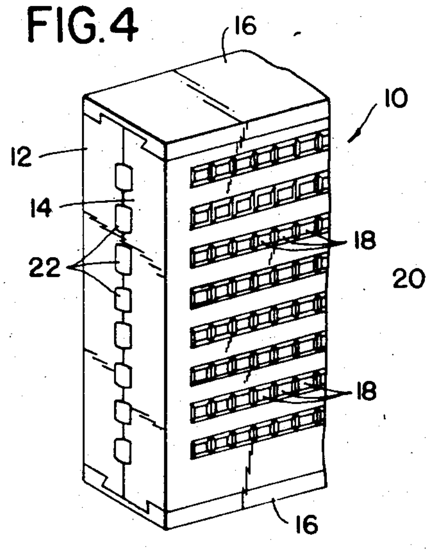
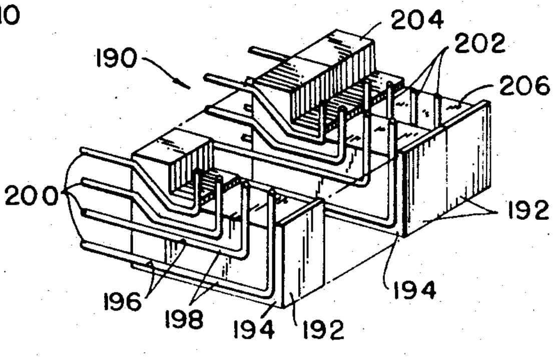
FIG. 5
INVENTOR
QUENTIN BERG
BY Whittemore, Hulbert + Belknap
ATTORNEYS Nov. 17, 1970 Q. BERG 3,541,494

METHOD OF FORMING ELECTRICAL CONNECTIONS

Original Filed Aug. 21, 1967 4 Sheets-Sheet 3

INVENTOR
QUENTIN BERG

BY Whittemore, Hulbert + Belknap
ATTORNEYS

Nov. 17, 1970 Q. BERG 3,541,494

METHOD OF FORMING ELECTRICAL CONNECTIONS

Original Filed Aug. 21, 1967 4 Sheets-Sheet 4

INVENTOR

QUENTIN BERG

BY Whittemore, Hulbert + Belknap

ATTORNEYS

United States Patent Office 3,541,494

Patented Nov. 17, 1970

3,541,494

METHOD OF FORMING ELECTRICAL CONNECTIONS

Quentin Berg, % Berg Electronics, Inc., York Expressway, New Cumberland, Pa. 17070

Original application Aug. 21, 1967, Ser. No. 662,147. Divided and this application Apr. 17, 1969, Ser. No. 817,012

Int. Cl. H01r *13/54*

U.S. Cl. 339—75 5 Claims

ABSTRACT OF THE DISCLOSURE

The disclosure relates to a method of serially establishing electrical connections between pairs of male contacts. The male contacts are freely positioned in a connector block, following which a cam pin is inserted into the block to stress contact springs serially and force them against the pairs of contacts to establish the electrical connections. As the springs are stressed by the cam pin, the contact portions are wiped across the male contacts thereby assuring a reliable electrical connection.

This application is a division of my copending application Ser. No. 662,147, filed Aug. 21, 1967, for "Connector Block."

BACKGROUND OF THE INVENTION

The invention relates to the method of forming electrical connections in connector blocks used in the electronics industry. The method is particularly useful in connector blocks used in electronic computers or other electronic apparatus where it is necessary to establish a large number of reliable connections within a minimum of space.

In the present computer technology the emphasis is placed strongly on developing smaller and smaller circuit elements which occupy a minimum of space. It is difficult to establish electric connections between such miniature circuit elements and conventional connectors. Because of the relatively high insertion force necessary to insert circuit elements into conventional circuit blocks, there is a high risk that these elements will break during insertion, thus rendering the circuit completely or partially inoperative.

The problem of establishing electrical connections with small circuit elements becomes more completely apparent when it is appreciated that in the present computers it is sometimes necessary to attach circuit elements having as many as 100 contacts thereon in circuit blocks where the insertion force per contact is required to be as high as 2 or 3 pounds in order to establish a reliable connection. The total insertion force for a circuit element having 100 contacts would be about 200 to 300 lbs.

SUMMARY OF THE INVENTION

In contrast to the conventional method of forming electrical connections where a high insertion force is required, in the method of the invention circuit elements are freely inserted into a connector block at low or zero insertion force. After the elements are seated in their contact position in the block, contact springs in the block are serially stressed by inserting a cam pin to establish high pressure connections between the springs and the contact areas of the circuit elements. As the springs are stressed the contact areas thereof are wiped across the circuit element contacts to assure that a clean and low resistance connection is established.

The connector block comprises a number of rows of spring contacts, each row including up to 100 or more contacts. After insertion of the circuit elements in the connector block the springs in each row are stressed serially to establish a relatively uniform contact pressure of about 1 lb. per contact. Due to the serial stressing of the spring contacts, the force required to insert the cam pin into the connector block and stress the spring contacts is low enough to permit manual insertion of the pin and stressing of the springs. This feature permits ready substitution of circuit elements in the connector block without affecting other circuits held therein or removing the block from its place of installation.

Other advantages and features of the invention will become apparent as the description proceeds, especially when taken in conjunction with the accompanying drawings illustrating preferred embodiments of the invention.

DESCRIPTION OF THE DRAWINGS

FIGS. 2 and 3 are sectional views taken through connector blocks illustrating the use thereof;

FIG. 4 is an enlarged perspective view of one end of a connector block;

FIG. 5 is an exploded perspective view of a header block useful in establishing connections between the connector blocks and circuit boards;

DESCRIPTION OF THE PREFERRED EMBODIMENTS

Figure 1:
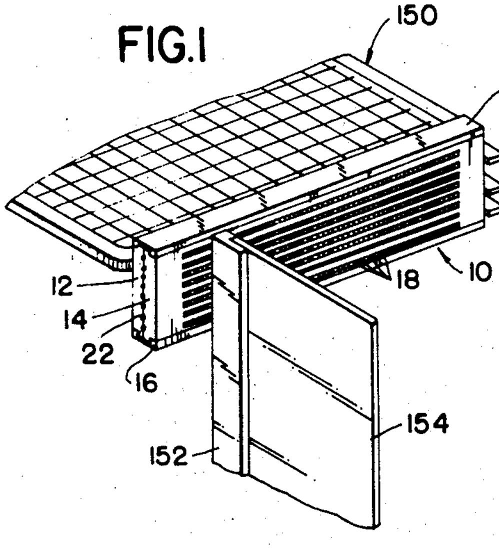
FIG. 1 is a perspective view showing a connector block according to the invention with circuit elements mounted thereon.

The connector block 10 is composed of two insulating half shells 12 and 14 which may be secured together by bevel clips 16 located at the top and bottom of the connector block or by other suitable means. Rows of opposed contact openings 18 extend along the length of the side faces of shells 12 and 14. The interior of the connector block is formed to provide a plurality of transversely oriented longitudinal cavities 20 which extend normal to the side walls of the shells 12 and 14 and each of which communicates with a pair of opposed openings 18. The interior cavities are arranged in rows along the length of the connector block so that a row of cavities 20 communicates a row of openings 18 on the side face of one shell with the opposite row of openings 18 on the side face of the other shell.

Figure 10:
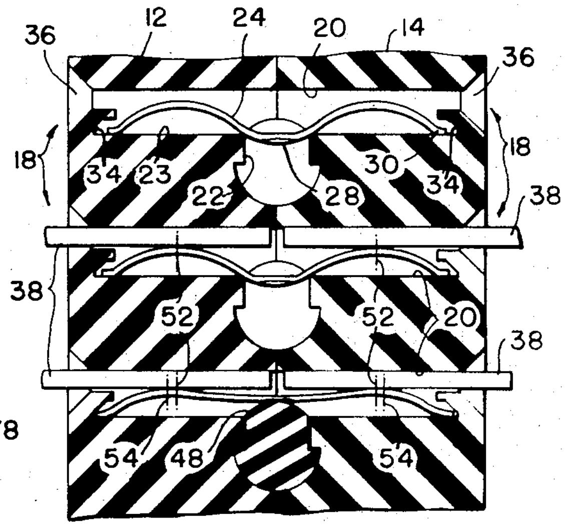
FIG. 10 is an enlarged partial sectional view of a connector block.

A longitudinal cam opening 22 is associated with each row of cavities 20 and intersects the bottom surface 23 of each cavity in the row, as shown in FIG. 10. Preferably openings 22 extend throughout the entire length of the block 10.

Figures 6, 7, 8:
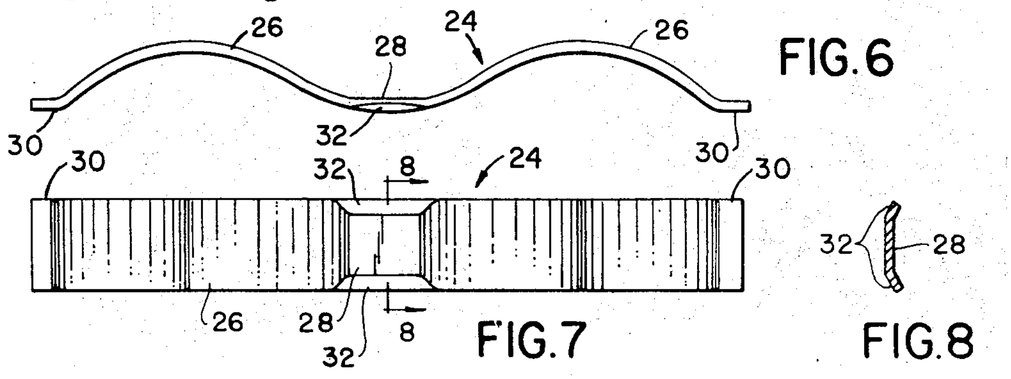
FIGS. 6, 7 and 8 are side, top and sectional views respectively of a spring used in the connector block.

A sinuous spring 24 is confined in each of the interior cavities 20. As illustrated in FIGS. 6, 7 and 8, the spring 24 is formed from a flat strip of spring metal and may be made of Phosphor bronze or other suitable metal. The spring includes a pair of upwardly extending contact portions 26 located to either side of cam portion 28. The outer ends of the contact portions are provided with feet 30 which are positioned slightly above the bottom of the cam portion 28. The sides of the cam portion 28 are provided with bevels 32 as shown in FIG. 8. Spring 24 is symmetrical about section line 8—8 of FIG. 7 so that the upwardly extending contact portions 26 thereof extend a like distance above the feet 30 and are located the same distance to either side of the center of the spring. As shown in FIG. 6, the sinuous shape of the spring 24 is formed by the use of gradual curves without any discontinuity or abrupt corners. This feature assures that stressing of the spring will be gradual and uniform when the cam portion 28 is loaded.

As illustrated in the upper portion of FIG. 10, springs 24 are freely confined within cavities 20 with the feet 30 extending into recesses 34 located at each end of the cavities and the cam portions 28 intersecting the longitudinal cam bore or opening 22 extending along the length of the connector block. Contact portions 26 of the spring 24 extend upwardly from the bottom surface of the cavity 22 past the lower wall of contact openings 18. Openings 18 are provided with bevels 36 to facilitate the insertion of contact pins 38 into the connector block.

Figure 16:
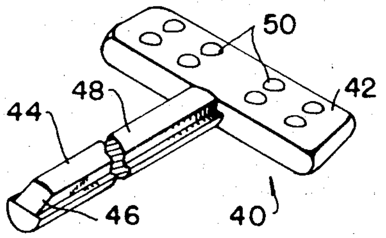
FIG. 16 is a partially broken away perspective view of a modification of the cam pin shown in FIG. 9.

Cam pin 40 shown in FIG. 16 includes a handle portion 42 and an elongate rod portion 44. The rod portion has a generally T-shaped cross section and is adapted to have a sliding fit within the T-shaped cam opening 22 of the connector block in FIG. 10. The rod portion 44 has a length approximately equal to the length of the connector block and includes a bevel cam portion 46 at the lead end thereof and an elongate lobe portion 48 extending from the cam portion 46 to handle 42. The handle 42 is provided with suitable indicating means 50 to facilitate proper orientation of the cam pin for insertion into the connector block.

Opposed contact pins 38 are freely inserted through openings 18 into cavity 20 and are loosely held therein between the upper wall of the cavity and the contact portions 26 of the spring 24. During insertion of the pins 38 the spring 24 is only slightly stressed and does not create any appreciable frictional drag opposing insertion of the contact pins. When the pins are fully inserted in the connector block, contact portions 26 engage the pins at 52. Contact pins 38 may be formed of wire having a round or square cross section. The cross section of the contact pins is not critical to the operation of the connector block.

After insertion of contact pins 38 into each opening 18 communicating with one row of cavities 20, a cam pin 40 is inserted into the cam opening 22 associated with that row of cavities. As the pin is pushed in the opening 22, the cam portion 46 at the lead end of the rod portion 44 engages the bevel 32 on one side of the cam portion of the first spring 24. Continued movement of the cam pin toward the spring forces the cam portion 28 of the spring up the cam portion 46 of the pin and onto the lobe portion 48. It will be seen that with continued insertion of the cam pin 40 into the connector block all of the springs in the row of cavities will be stressed serially or one at a time with the previously stressed springs riding along the elongate lobe portion 48 of the pin. The pin 40 is preferably formed of plastic or other insulating material having a low coefficient of friction such that the force required to insert the pin into the connector block and move the lobe portion 48 past stressed springs is low.

In connector blocks it is conventional to stress contact springs simultaneously when making the connection. Applicant's teaching of serially stressing the spring contacts represents a marked improvement over the conventional simultaneous stressing thereof since the force required to achieve serial stressing is appreciably less than that required for simultaneously stressing of spring contacts. In connector blocks where as many as 100 spring contacts are arranged in a single row it is possible to insert the cam pin manually and serially stress all of the spring contacts. It would be virtually impossible to stress spring contacts simultaneously by hand, particularly in the limited space available in modern electronic apparatus, such as computers and the like.

As the cam portion 28 of the spring rides up the cam portion 46 of pin 40, the spring 24 is stressed and elongated. The elongation of the spring during stressing thereof moves the contact between the contact portion 26 and pin 38 along the pin 38 from the point indicated by numeral 52 to the point indicated by numeral 54, thus assuring that a wiped, clean and resistance-free connection is established between each pin 38 and the spring 24. The wiping action of the spring past the pin during stressing of the spring is an important feature of the invention since, in computer and other electronic applications, it is essential that all connections be reliable and resistance-free.

Elongation of the spring member 24 moves spring feet 30 adjacent to the end walls of recesses 34. However, it does not move the feet into engagement with the end walls of recesses 34, so that the only forces acting on the spring 24 are normal to either the bottom wall 23 of the cavity 20, the lobe portion 48 of the cam pin, or the bottom surfaces of the contact pins 38. In this way lateral forces acting on the spring are eliminated and it is possible to control the contact pressure in each cavity in the connector block accurately. The elimination of lateral stresses on the spring increases the predictability of the contact forces between the springs and the contact pins, and also assures maximum wiping of the contact areas therebetween.

Insertion of the cam pin 40 in the connector block stresses all of the springs in the associated row of cavities and forms a reliable low resistance electrical connection between the contact pins 38 inserted in each cavity. To further increase the reliability of the connection formed between opposing contact pins, springs 24 may be plated with a highly conductive metal, such as gold. In some applications where it is desirable to establish a common connection between a number of contact pins, it is contemplated that the lobe portions 48 of the cam pin may be plated or formed of a conductive metal so as to establish an electrical connection between the springs in the rows of cavities. By forming metal contacts at given locations along the lobe portion 48 of the contact pin and selectively connecting the contacts on the pins, it is possible to program electrical connections between selected springs of a given row. This added flexibility of the invention is important since the interconnections are achieved through the cam pin 40, which is not an integral part of the connector block. Thus it is possible to interconnect the springs in a given manner by merely inserting the proper pin in the connector block and thus to modify the connector block circuitry without revising or removing the connector block from its position in the circuit.

Figure 17:
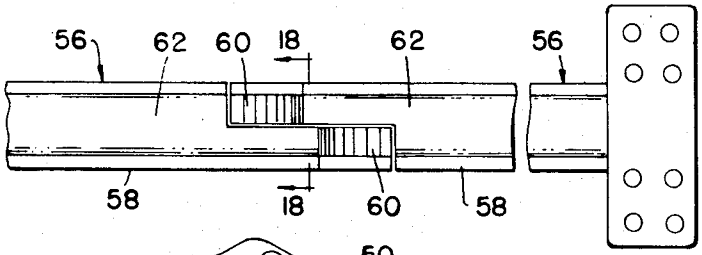
FIGS. 17 and 18 illustrate a further modification of the cam pin which permits insertion of a cam pin from both ends of the connector block.
Figure 18:
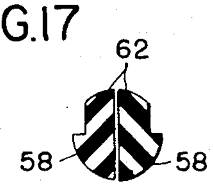

In some applications where a large number of cavities are formed in a single row along a connector block, the frictional drag between the springs and the cam pin is too great to permit the use of a single cam pin for stressing all of the springs in the row. In such case two cam pins 56 as shown in FIGS. 17 and 18 may be used. Each cam pin 56 is provided with a rod portion 58 having a length approximately equal to one-half of the length of the connector block. Each rod portion includes a bevel cam portion 60 at the lead end thereof and an elongate lobe portion 62. One side of the lead end of each rod portion 58 is cut away as shown in FIG. 17. One pin 56 is inserted into each end of the cam bore associated with the row of cavities in a connector block. When both pins are fully inserted, all of the springs in the row are stressed since, as shown in FIG. 18, there is a continuous lobe portion 62 extending from one end of the connector block along one pin 56 to the center of the connector block and then along the other pin 56 to the other end of the connector block. In this way the insertion force required to stress the springs is reduced since each pin 56 stresses only one-half of the springs in the given row of cavities.

Figure 9:
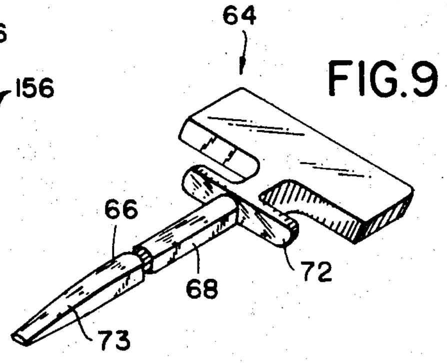
FIG. 9 is a perspective and partially broken away view of a cam pin used to stress the springs in the connector block.
Figure 11:
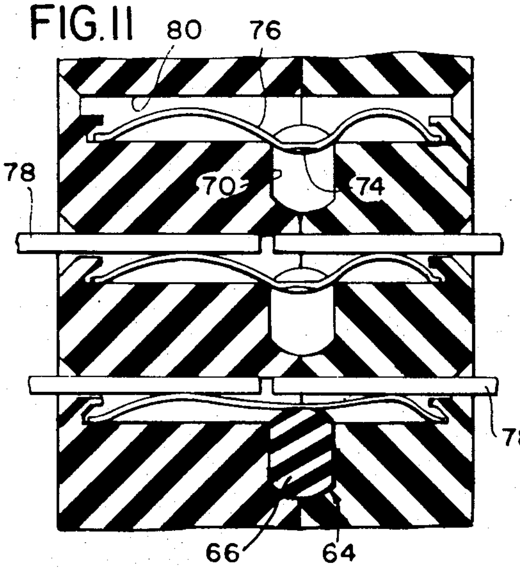
FIG. 11 is like FIG. 10, illustrating a modification of the connector block.

FIG. 9 illustrates a modified form of cam pin 64 in which the rod portion 66 is provided with flat side walls 68 used to orient the pin in a cam opening 70 as shown in the connector block illustrated in FIG. 11. Stop 72 is provided to prevent over-insertion of the pin 64 in the connector block. The lead end of the rod portion 66 is tapered to provide a cam portion 73 for engaging and stressing the springs in the connector block.

The connector block shown in FIG. 11 is similar to that of FIG. 10 with the exceptions that the cam opening 70 and the cam portions 74 of the springs 76 are offset to the right of the center of the block. Thus when the contact pins 78 are inserted into the cavities 80 and the springs 76 are stressed by cam pins 64, a greater contact force is provided at the connection between the spring and the pin to the right of the cam pin than is provided at the connection between the contact pin and spring to the left of the cam pin. This is because the short portion of the spring 76 to the right of the cam pin 64 is more heavily stressed than the longer portion of the spring to the left of the cam pin 64. Despite the offset nature of the spring 76, the stressing of the spring 76 by cam pin 64 wipes the contact areas thereof past the contact pins 78 to establish the desired clean, wiped connection there between.

The offset configuration shown in FIG. 11 has the advantage of enabling the contact pins to the left of the cam pin to be manually removed from the connector block without the necessity of first removing the cam pin 64. While the contact pressure between the spring member 76 and the contact pins to the left of the cam pin is less than the contact pressure provided in the connector block of FIG. 10, it is sufficient to provide a reliable connection suitable for use in computers and other delicate electronic circuits. The connector block of FIG. 11 is particularly adapted for use where it is desirable to establish a connection with a header or other circuit element carrying a row of pins inserted in a connector block normal to the rows of cavities 80. In this way the transverse row of pins 78 may be manually inserted into the connector block or removed therefrom on the left-hand side of the block without the necessity of first removing all of the cam pins 64 to reduce the contact pressure sufficiently to enable manual movement of the pins.

Figure 12:
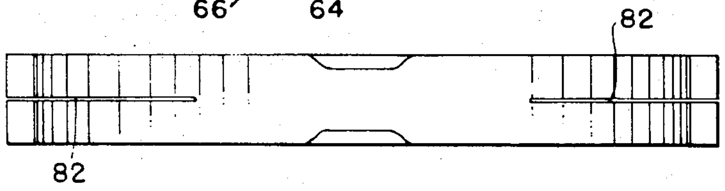

FIG. 12 is a top view of a modified spring like that shown in FIGS. 6, 7 and 8 but with the exception that longitudinal slits 82 extend from the ends of the spring toward the center thereof past the crest of the contact portions. These slits bifurcate the contact portions, thus providing a redundancy of contacts between the spring and the contact pins. By providing redundant contacts the reliability of the connection between the spring and the contact pins is increased.

Figure 14:
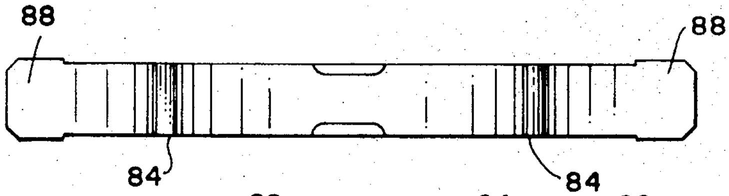
Figure 15:

FIGS. 14 and 15 are top and side views, respectively, of a further modification of the spring shown in FIGS. 6, 7 and 8 wherein a lateral contact ridge 84 is provided at the top of each contact portion 86. By providing contact ridges 84 in the spring the contact area between the spring and the contact pins in the connector block is reduced, thus increasing the contact pressure. Ridges 84 improve the wiping action between the spring and the contact pins and also the electrical connection therebetween. The end portions 88 of the spring shown in FIG. 14 are slightly wider than the rest of the spring so as to accurately locate the spring between the side walls of the cavity in the connector block.

Figure 13:
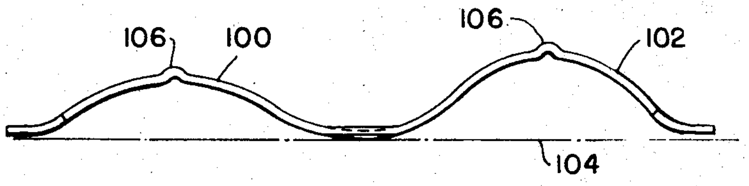
FIGS. 12, 13, 14 and 15 illustrate modifications of the spring illustrated in FIGS. 6, 7 and 8.

FIG. 13 is a side view of a further modification of the spring wherein contact portion 100 is similar to contact portion 86 of the spring shown in FIGS. 14 and 15 and contact portion 102 has an increased altitude above base line 104 greater than the altitude of contact portion 100. Each contact portion is provided with a contact ridge 106 similar to contact ridges 84 in FIGS. 14 and 15. The cam portion and feet of the spring of FIG. 13 are similar to those shown in other springs.

Figure 21:
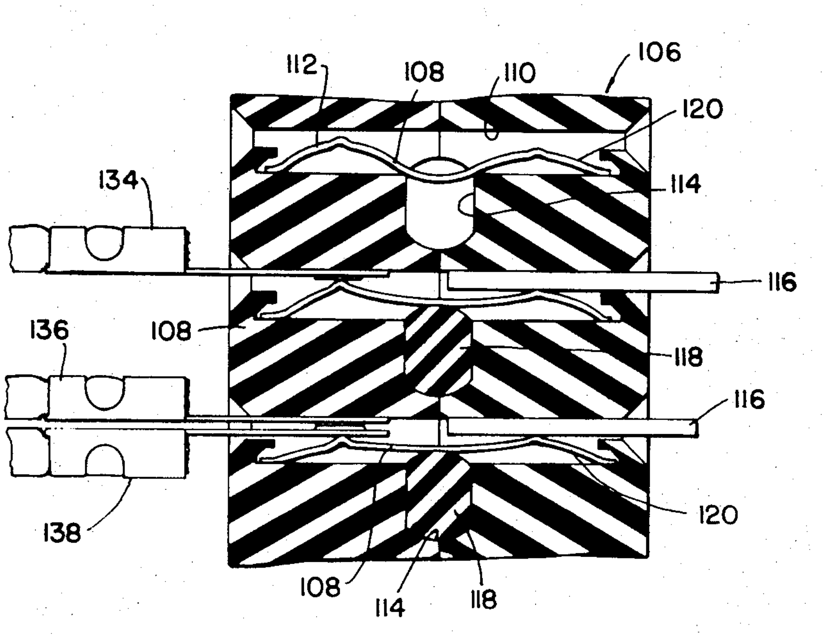
FIG. 21 is a sectional view like that of FIGS. 10 and 11 illustrating a connector block with springs like those shown in FIG. 13 and lugs like those shown in FIGS. 19 and 20.

Connector block 106 of FIG. 21 utilizes springs 108 similar to the spring shown in FIG. 13. Springs 108 are confined in cavities 110 of connector block 106 with the raised contact portion 112 positioned to the left of the cam opening 114. Pin contacts 116 like pin contacts 38 and 78 shown in FIGS. 10 and 11 are inserted through the contact openings on the right side of the connector block 106 and, upon insertion of cam pin 118, are in positive electrical connection with the contact portion 120 of the spring. The contact ridge on the crest of contact portion 120 assures that a high pressure wiped electrical connection is established between pin contacts 116 and spring 108.

Figure 19:
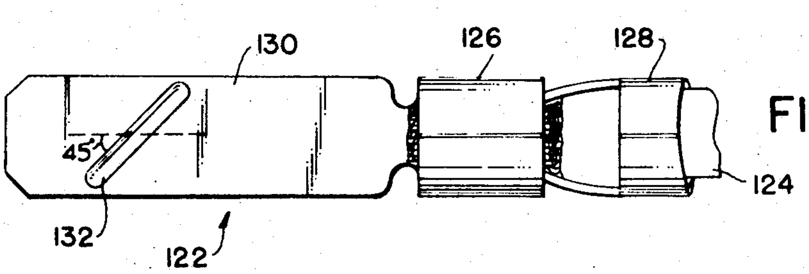
FIGS. 19 and 20 are top and side views respectively of a lug contact useful in establishing connection between a wire and the connector block.
Figure 20:
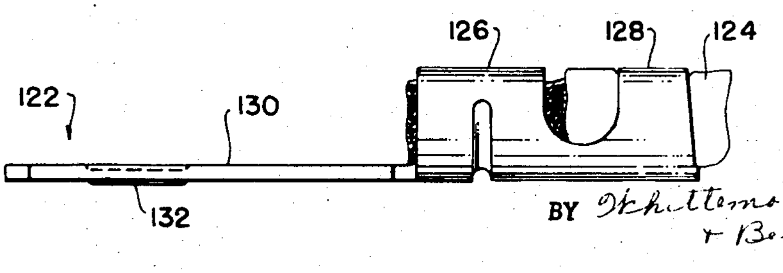

While the connector block 106 may be used to establish an electrical connection between pins 116 and similar pins inserted on the lefthand side of the block, it is also useful in establishing connections between a pin connector 116 and a lug 122, shown in FIGS. 19 and 20, which is crimped to wire 124. The lug 122 includes wire crimp ferrule 126 and insulation crimp ferrule 128 for establishing reliable electrical and physical connection with the wire 124. Flat lug portion 130 extends outwardly of the wire and insulation crimp ferrules and is provided with a contact ridge 132 which projects away from the lug portion on the opposite side thereof from the wire and insulation crimp ferrules 126 and 128. Ridge 132 is oriented at an angle of roughly 45° to the longitudinal axis of the lug 122. The thickness of the lug portion 130 plus the extension of the contact ridge 132 at the bottom surface of the lug is equal to approximately one-half the thickness of contact pin 116 as best illustrated in FIG. 21.

When it is desirable to make an electrical connection between a contact pin and a single lug 134, like lug 122 shown in FIGS. 19 and 20, the lug portion of lug 134 is inserted into the lefthand portion of cavity 110 of connector block 106 with the contact ridge thereof facing away from the upper wall of the cavity and opposite the raised contact portion of the spring 108 confined in the cavity. Because of the raised altitude of contact portion 112 of spring 108, a reliable electrical connection will be established between the contact ridge of contact portion 112 and the contact ridge 132 of lug 134 upon insertion of cam pin 118 in cam opening 114. The spring member 108 will be flexed by the cam pin 118 so as to wipe the contact area 112 past lug contact ridge 132 and establish a positive metal-to-metal electrical connection therebetween.

Where it is desirable to make an electrical connection between a contact pin 116 and two contact lugs 136 and 138, the lug portions thereof may be inserted in the lefthand side of the cavity 110 of connector block 106 as shown at the bottom of FIG. 21 with the contact ridges 132 abutting each other. Since ridges 132 are at a 45° angle to the axis of the lugs 136 and 138, they will cross each other to define a point connection between the two lugs. The wire and insulation crimp ferrules of lugs 136 and 138 being positioned on opposite sides of the lugs from the contact ridges, they do not interfere with the insertion of the lugs into the connector block or the electrical connection between the spring 108 and the lugs. Insertion of the cam pin into the connector block will flex the spring 108 so as to wipe the contact ridge of contact portion 112 over the flat surface of lug 138 to form an electrical connection therewith and also bias lug 138 toward lug 136 thereby forming a high pressure and reliable electrical connection therebetween at the intersection of the crossed contact ridges 132.

While FIG. 21 illustrates the establishment of an electrical connection between one or two lugs and a contact pin, it is contemplated that the connector blocks shown therein may be used to establish electrical connections between two, three or four lugs wherein one or two lugs would be substituted for pins 116 of FIG. 21. In this case it would be desirable to increase the altitude of contact portion 120 located to the right of the cam opening 114, thereby assuring that sufficient contact pressure will be available for establishing an electrical connection between contact portion 120 and a single lug.

By the use of lugs 122 the connector block may be used as a highly flexible wiring board. The utility of the wiring board may be increased by utilizing all-metal or programmed cam pins of the type described previously. The lug contacts of the type disclosed herein may be formed from suitable thin sheet metal stock and are preferably plated with a conductive coating to improve their contact properties.

Typical uses of the invention are disclosed in FIGS. 1, 2 and 3. FIG. 1 illustrates the use of a connector block 10 for establishing electrical connection between the contact pins of an electronic computer memory frame 150 and of header block 152 which extends perpendicular to the rows of contact openings in the connector block. The contact pins carried by header block 152 are connected to circuit paths in circuit member 154 which typically is a printed circuit board. Cam pin handles 156 indicate that three cam pins have been inserted in the connector block for establishing connections between opposed contact pins.

FIG. 2 is a partial sectional view of a connector block 158 illustrating establishment of electrical connections between opposed memory frame connector pins 160 and contact pins 162 projecting from transverse header block 164. Pins 162 extend through the body of the block 164 and are suitably connected to circuit board 166. Pins 160 are provided with stops 168 which serve to limit insertion of the pins into the connector block 158 and locate memory frame boards 170 relative to the connector block. Bevel cap 172 secures together the two shell halves of the connector block 158.

FIG. 3 illustrates the use of connector block 174 for establishing connections between memory frame boards 178 and header block 180 and contact board 182. Board 182 carries a number of wire contacts 184, the ends of which project into spring cavities in the connector block 174 so as to establish an electrical connection between a pair of memory frame board contact pins 176. Header block 180 extends along the length of the connector block 174 and includes contact wires 184. These wires establish an electrical connection between the block 174 and circuit element 186 which, as in the case of FIGS. 1 and 2, is a printed circuit board.

FIG. 5 is an exploded view of part of a header block 190 like header blocks 152, 164 and 180 illustrated in FIGS. 1, 2 and 3, respectively. The header block 190 is formed from a plurality of wafer elements 192 which are sandwiched together at adjacent side faces along the length of the header block. The wafer elements may be formed from a suitable plastic or other insulating material. One side face 194 of each wafer element is provided with a number of wire-receiving grooves 196 (see FIG. 3). Contact wires 198 are fitted within grooves 196 with the ends thereof projecting outwardly from the wafers normal to two adjacent side walls. Contact wire ends 200 are spaced along the rear wall of the header block for insertion into a connector block as shown in FIGS. 2 and 3. The other ends 202 of contact wires 198 project outwardly of the header block in a side wall normal to the rear wall. Abutment 204 projects upwardly from this side wall adjacent the rear wall to provide a circuit board stop for orienting the header block relative to a circuit board, as shown in FIGS. 1, 2 and 3. Contact wire ends 202 project upwardly from the header block through shallow groove 206 so that the bottom of the groove 206 and the circuit board bottom adjacent ends 202 are separated and solder wicking between the contact wire ends 202 is prevented when the wires are soldered to the circuit board.

When, as illustrated in FIGS. 1 and 2, it is desirable that the header block run transverse to the longitudinal axis of the connector block, contact wires are provided in all four of the grooves 196 in the wafer elements 192 so as to provide a contact wire end 200 for insertion in each adjacent contact opening in the connector block. When it is desirable that the header block run along the connector parallel to the axis thereof, only two contact wires are provided in each wafer element since the spacing between adjacent rows of contact openings in the connector block is twice the spacing between adjacent contact openings in a given row. Thus, as illustrated in FIG. 3, two contact wires 184 are provided in each wafer element and two of the grooves 196 therein are not used.

While the embodiments of the invention disclosed herein are described in relation to establishing electrical connections between opposing pairs of metal contacts, it is contemplated that the connector block may be used to establish eelctrical connections between a variety of contacts having exposed contact surfaces. Thus it is contemplated that the invention will be useful in establishing electrical connections between a contact member and contact elements of an integrated circuit module or a printed circuit tape, contact parts of which may be inserted through the contact openings and into the interior cavities with exposed metal contact portions facing the contact springs. Upon insertion of the cam pin the spring will establish a wiped electrical connection with the exposed contact surface of the printed circuit tape. The interior cavity side walls between adjacent cavities may be eliminated to permit insertion of the end of a card or tape having spaced contacts into the connector block for the establishment of connections therewith.

Additionally, one side of each spring element in the connector block may be provided with an integral male contact. The male contact will project outwardly of the connector block through one contact opening for connection with a female type connector or a wrapped wire. The male contact and spring member can be formed either from a single piece of metal having suitable conductive and spring properties or from suitable spring and contact elements secured together by, for example, welding or crimping.

While I have illustrated and described preferred embodiments of my invention, it is understood that these are capable of modification.

What I claim as my invention is:

1. The method of establishing electrical connections between two series of circuit elements comprising the steps of providing a connector block having a series of electrical contacts therein, removably inserting one series of circuit elements into one side of the connector block and removably inserting the other series of circuit elements into another side of the connector block so that each electrical contact within the block is associated with a circuit element of each of said circuit element series, and serially moving said electrical contacts toward said pairs of circuit elements to form wiped, biased electrical connections simultaneously between each electrical contact and a circuit element of each series with each electrical contact forming part of a circuit path between a pair of circuit elements.

2. The method of establishing electrical connections between circuit elements comprising the first step of positioning a plurality of circuit elements within a connector block, including in said first step simultaneously moving a number of such circuit elements into the connector block, in order to associate each of a number of pairs of circuit elements with one contact of a series of contacts confined within the connector block and then a second step of serially moving said contacts toward said pairs of circuit elements to bring each of said contacts into engagement with at least one circuit element in each pair of circuit elements to form circuit paths between the circuit elements of said pairs.

3. The method of claim 2 including the step of bringing each contact into electrical connection with both the circuit elements of one of said pairs so that the contacts form part of the circuit paths between said circuit elements.

4. The method of claim 3 including the step of forming wiped, biased electrical connections between said circuit elements and contacts.

5. The method of claim 3 including the steps of inserting two series of circuit elements into said connector block from opposite sides of the connector block, and associating a circuit element of each series with a contact in the connector block.

References Cited

UNITED STATES PATENTS

| | | | |
|---|---|---|---|
| 330,466 | 11/1885 | Brown | 200—153.12 |
| 2,877,439 | 3/1959 | Avery | 339—151 |
| 3,161,733 | 12/1964 | Bowser et al. | 200—16 |
| 3,214,725 | 10/1965 | DeRose et al. | 339—151 |
| 3,270,148 | 8/1966 | Oxley | 200—14 |

FOREIGN PATENTS

| | | |
|---|---|---|
| 1,073,056 | 1/1960 | Germany. |

MARVIN A. CHAMPION, Primary Examiner

J. M. McGLYNN, Assistant Examiner